Oct. 2, 1951  R. F. WILD  2,569,791
VOLTAGE CONTROL SYSTEM UTILIZING FREQUENCY MODULATION
Filed Jan. 10, 1947  3 Sheets-Sheet 1

INVENTOR.
RUDOLF F. WILD
BY Arthur H. Swanson
ATTORNEY

INVENTOR.
RUDOLF F. WILD
BY Arthur H. Swanson
ATTORNEY

Oct. 2, 1951     R. F. WILD     2,569,791
VOLTAGE CONTROL SYSTEM UTILIZING FREQUENCY MODULATION
Filed Jan. 10, 1947     3 Sheets-Sheet 3

*INVENTOR.*
RUDOLF F. WILD

BY Arthur H. Swanson

ATTORNEY

Patented Oct. 2, 1951

2,569,791

UNITED STATES PATENT OFFICE 2,569,791

VOLTAGE CONTROL SYSTEM UTILIZING FREQUENCY MODULATION

Rudolf F. Wild, Philadelphia, Pa., assignor, by mesne assignments, to Minneapolis-Honeywell Regulator Company, Minneapolis, Minn., a corporation of Delaware Application January 10, 1947, Serial No. 721,419

7 Claims. (Cl. 171—95)

The general object of the present invention is to provide an improved method of and apparatus for measuring small unidirectonal voltages, and for effecting control actions in accordance with the varying values of said voltages. A more specific object of the invention is to provide improved means for amplifying small unidirectional voltages without requiring them to be converted into alternating voltages prior to their amplification, and a still more specific object of the invention is the provision of relatively simple and effective means for utilizing high frequency alternating currents in the amplification of small unidirectional voltages.

In the practice of the present invention, use may be made of apparatus of various forms, some of which are illustrated and described herein by way of example. In general, the preferred embodiments of the present invention devised by me are alike in that each of them comprises a circuit network having input terminals and output terminals and including a high frequency electronic oscillator combined with a reactance control tube, and means for varying the amplification factor of the reactance tube thereby to vary the oscillator output frequency in automatic response to a variation in unidirectional voltage which is impressed on the network input terminals for amplification. The circuit network which I employ includes frequency discriminating means with its input terminals connected to the output terminals of the oscillator, usually through amplifying means, and in some cases, also, through amplitude limiting means and frequency multiplier means. The output terminals of the frequency discriminator element of the amplifying network constitute the output terminals of said network.

The present invention is well adapted for various uses in which a minute unidirectional voltage is to be measured or utilized in producing control effects dependent on its varying value. Thus, for example, in one use of my invention, a thermocouple is connected to the input circuit of the network and a current created by the thermocouple voltage is so amplified that the thermocouple temperature can be measured by a milliammeter connected to the output terminals of the amplifying network. In addition to its use in the direct measurement of a thermocouple voltage as just mentioned, the invention may be used to control the operation of the reversible rebalancing motor of a self-balancing measuring apparatus of the well known type comprising a null type potentiometer bridge circuit and a measuring branch connected between points of the bridge circuit, one of which is adjusted by the motor in accordance with the varying value of a thermocouple voltage or other unidirectional voltage included in the measuring branch. The invention is also well adapted for use in the continuous automatic standardization of the bridge circuit of self balancing potentiometric measuring apparatus.

Apparatus constructed and operating in accordance with the present invention is characterized by its capacity for stable operation with high and regulable sensitivity. The utilization of high frequency currents in amplifying small unidirectional currents is characterized by the avoidance of interaction between the high frequency and unidirectional currents, and the ease with which high frequency currents can be separated from the unidirectional currents by relatively simple filter provisions. The invention is characterized also by the fact that it permits of high amplification of minute unidirectional voltages without objectionable drift and without requiring that, preparatory to its amplification, the unidirectional current be converted into an alternating current.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings—

Fig. 1a is a diagram illustrating a modified portion of the network shown in Fig. 1;

Figure 1:
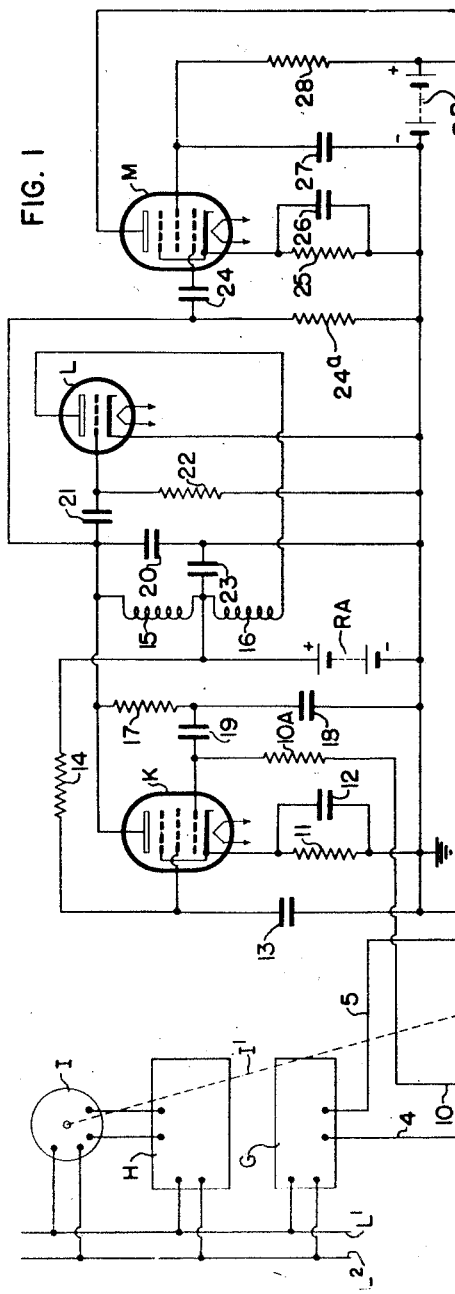
Fig. 1 is a diagrammatic representation of one embodiment of the invention.

In Fig. 1 I have diagrammatically illustrated a form of the present invention used to maintain an approximately constant, predetermined energizing current flow in the potentiometer bridge circuit of a self balancing potentiometric measuring system. The latter may be, and as shown and hereinafter described is of conventional type, except in respect to its bridge circuit energizing means. In a manner hereinafter explained, a current flow is created in a resistor J when the bridge energizing current is different from a predetermined normal value. One end of the resistor J is connected to the bridge circuit at the point C and is also connected to ground. When the bridge current flow is at its predetermined normal value, there is no current flow through the resistor J but when the bridge current value exceeds or is less than the predetermined normal value, current flows through the resistor J respectively toward or away from the bridge point C, and increases and decreases in magnitude as the difference between the actual and predetermined values of the bridge energizing current increases and decreases.

In the arrangement shown in Fig. 1, the resistor J thus forms a means for creating a signal voltage which varies in magnitude and polarity, relative to the ground potential, with the extent and direction of departure of the bridge energizing current from its predetermined normal value. The voltage signal created by current flow in the resistor J is transmitted by a conductor 10, including an isolation resitor 10A, to the control grid of a so-called reactance tube K. The latter operates in a well known manner to increase and decrease the oscillation frequency of an oscillator triode L from a predetermined value as the potential of the control grid of the tube K becomes less or more negative relative to the cathode of the tube. The output circuit of the tube L is coupled by an amplifier tube M to the input circuit of an amplitude limiting tube O. The latter is coupled in a conventional manner by a high frequency transformer P to the input circuit of a balanced frequency discriminator Q. The latter is tuned to balance at a predetermined frequency different from the resonant frequency of the oscillator L for a purpose hereinafter described.

The above mentioned elements J, K, L, M, O, P, and Q are combined in a control system which continuously tends to maintain the bridge energizing current at a predetermined value. The control system thus provides continuous standardization for the bridge circuit A. The overall operation of the bridge standardizing control system may be summarized as follows. When the bridge energizing current has its predetermined normal value no signal or bias voltage is transmitted from the resistor J to the reactance tube K, and the oscillator tube L then operates with its resonant frequency which may be of the order of one megacycle. On a variation in the bridge energizing circuit from its normal value, a voltage signal is transmitted from the resistor J to the reactance tube K which then causes the oscillator tube L to oscillate with a frequency greater or less than its predetermined frequency, accordingly as the bridge energizing current is above or below its normal value. When the oscillation frequency of the oscillator tube L is thus increased or decreased, the discriminator Q operates to decrease or increase the bridge energizing current as required to return the latter approximately to its normal value.

As shown in Fig. 1, the potentiometric bridge circuit A comprising a branch including a slide wire resistor 1 engaged by a slider contact B adjustable along the length of the resistance 1, and a second branch including fixed resistances 2 and 3. Each of said branches is connected at one end to one end of the other branch at the point C, and is connected at its opposite end to the second end of the other branch at the point D. As already indicated, the form and intended use of the circuit A are conventional, except in respect to the means employed to maintain a suitable constant unidirectional current flow through the slide wire resistance 1, and through the resistances 2 and 3 between the points C and D.

As shown in Fig. 1, the measuring circuit is used to measure the voltage of a thermocouple F which is included in a measuring branch of the circuit network in series with a current or unbalance detecting device G and conductors 4 and 5, between the slider contact B and the bridge circuit point E at which the resistances 2 and 3 are connected.

As diagrammatically shown in Fig. 1, the device G operates through apparatus H to control the operation of a reversibly rotating, rebalancing motor I. In the balanced condition of the measuring apparatus, the thermocouple voltage is balanced by the potential difference between contact B and point E, and no current then flows through the thermocouple F, and the motor I is at rest. On a change in the voltage of the thermocouple F, current flows through the measuring branch of the circuit network and the current responsive device G actuates the control apparatus H to operate the motor I in the direction and to the extent required to adjust the slider contact B along the resistance 1 into the position in which the potential difference between the contact B and bridge point E is again equal and opposite to the thermocouple voltage. When this balanced condition is attained, current flow through the thermocouple F ceases and the motion of the motor I is interrupted. The motor I adjusts the contact B through a mechanical connection diagrammatically indicated by the dotted line I'.

While the current responsive device G, control apparatus H and motor I may take other known or suitable forms, they may well be, and are herein assumed to be like the converter element, the voltage amplifier and motor drive system, and the reversible rebalancing motor, respectively, of a conversion type self balancing potentiometer now in extensive use in this country. When operating as it does in the conversion type potentiometer, the element G divides the unidirectional current flow through the thermocouple into current pulses, and utilizes those current pulses to induce an alternating current signal which is proportional in magnitude to the unidirectional current, and is of one phase, or of a second phase displaced 180° from the first mentioned phase, depending on the direction of current flow through the thermocouple. The alternating current signal thus created by the device G, is impressed on the input circuit of the voltage amplifying and motor drive system H, and the latter operates the motor I in one direction or the other, depending on the direction of current flow through the thermocouple. The elements G, H and I include alternating current energizing devices which are connected to a source of alternating current such as supply conductors L' and L², supplying current of commercial voltage and frequency, for example, 115 volts and 60 cycles per second.

Further references herein to the characteristics of the elements G, H and I are unnecessary, as those elements are not claimed as novel herein, and are included in the conversion type potentiometer, which is disclosed and claimed in the Patent No. 2,423,540 granted July 8, 1947, on an application of Walter P. Wills, filed December 1, 1941, and is also shown and described in the Wills Patent 2,385,481 of September 25, 1945.

In the arrangement shown in Fig. 1, the bridge circuit A is energized by a source of unidirectional current R diagrammatically shown as a battery, but which may well be a rectifier type power supply. The current source R is connected in series with the bridge circuit A resistance branches in the output circuit of an electronic triode 6. The electronic valve 6 and an electronic valve 7 are included in the circuit of the balanced frequency discriminator Q. The unidirectional currents flowing through the respective output circuits of the valves 6 and 7, the bridge circuit resistance between the points C and D, and the resistance 8 are so chosen and related that the voltage between the bridge points C and D normally exceeds the opposing voltage across the resistance 8, by an amount equal to, and in bucking relation with the voltage of a standard cell Sc. The latter has its positive terminal connected at the point $d$ to that end of the resistance 8 which is connected to the anode of the valve 7, and has its negative terminal connected through the previously mentioned resistor J to the bridge circuit point C and to the anode of the valve 6.

With the predetermined normal current flow through the slide wire 1, the resultant of the potential drop in the bridge circuit between points C and D and in the resistance 8 between points D and $d$, is equal to and in bucking relation with the voltage of the standard cell Sc. In consequence, there is then no current flow through the standard cell. When the current flowing through the slide wire 1 varies from its normal value it causes a current flow through, and voltage drop in the resistor J. That voltage drop increases or decreases the potential of the end of resistor J connected to the negative terminal end of the cell Sc with respect to ground accordingly as the flow through the resistor J is toward or away from the point C. The potential drop in the resistor J is thus a measure of the variation from normal of the current flow through the bridge circuit between the points C and D.

As previously noted, the potential drop in the resistor J provides a control signal which is transmitted by conductor 10 to the control grid of the reactance tube K. The latter has its suppressor grid connected to its cathode, and has its screen grid connected to ground through a condenser 13 and connected through a resistance 14 to the connected ends of inductance coils 15 and 16 included in the circuit of the oscillator triode L. The second end of the coil 15 is connected to the anode of the valve K and is connected to ground through a resistance 17 and a condenser 18. The connected terminals of the resistance 17 and condenser 18 are connected through a condenser 19 to the conductor 10 and to the control grid of the valve K. The anode of the valve K is also connected to ground through a condenser 20, and is connected through a condenser 21 to the control grid of the oscillator valve L. Said control grid is also connected to ground through a resistance 22. The connected terminals of the coils 15 and 16 are connected to ground through the condenser 23, and the end of the coil 16 remote from the coil 15 is connected to the anode of the oscillator valve L. As shown, anode voltage is supplied to the valves K and L by a battery RA or other source of unidirectional current, which is connected between ground and the point of engagement of the coils 15 and 16. The cathode of the valve L is connected to ground.

As will be apparent to those skilled in the art without further explanation, the reactance tube K and oscillator tube L are combined in a well known manner for control of the oscillation frequency of the tube L by varying the gain, or amplification factor, of the tube K. The valve L is arranged to oscillate at a predetermined frequency when no signal is impressed on the control grid of the reactance tube K, and to oscillate at a frequency higher or lower than the predetermined frequency when a control signal is impressed on the control grid of the tube K and respectively increases or decreases the gain or amplification factor of the tube K.

The output circuit of the oscillator tube L is coupled to the input circuit of the amplifier tube M. The coupling means shown comprise the ground connections to the cathodes of the two tubes, and a circuit branch including a condenser 24 by which the control grid of the valve M is connected to the control grid of the valve L. The cathode of the tube M is connected to ground through a resistance 25 and a bypass condenser 26 and is connected to the control grid by these elements and by a resistor 24a. The tube M is shown as a pentode which has its suppressor grid connected to the cathode of the tube. Its screen grid is connected to ground by a condenser 27 and is connected to the anode of the valve M through a resistance 28, a coil 29 and a condenser 30 in parallel with the coil 29. As diagrammatically shown, anode voltage is supplied to the anode of the tube M by a battery RB or other source of unidirectional current.

The coil 29 and a coil 31 inductively couple the amplifier tube M to an amplitude limiting tube O. The latter is shown as a pentode which has its cathode connected to ground and has its control grid connected through a resistance 33 to ground, and through a condenser 34 to one terminal of the coupling coil 31 and to one terminal of a condenser 32 in parallel with the winding 31. The second terminals of the coil 31 and condenser 32 are connected to ground. The cathode of the valve O is directly connected to the suppressor grid of the valve, and is connected through a condenser 35 to the screen grid of the valve and to a slider contact 36'. The latter engages and is adjustable along a slide wire resistance 36 which has one end connected to ground and has its other end connected to the anode of the valve O through an inductance 37 and a tuning condenser 38 in parallel therewith. Anode voltage is supplied to the anode of the tube O by a source RC of unidirectional voltage which is shown as a battery. For output voltages of the amplifier M in excess of a predetermined amplitude, the tube O acts in a well known manner as a limiter in which the amplitude of its output current is prevented from exceeding a predetermined value by the anode current saturation and cutoff actions of the tube.

The coil 37 serves as the primary winding of an intermediate frequency transformer through which the tube O is coupled to the balanced frequency discriminator Q. The input circuit of the discriminator Q includes the secondary winding of the transformer P. Said secondary winding is split into two sections 39 and 40. The sections 39 and 40 are respectively included in the input circuits of the triode valves 6 and 7 of the balanced frequency discriminator Q. The midpoint of the divided secondary winding is also connected through a blocking condenser 41 to that terminal of the primary winding 37 which is connected to the anode of the valve O. The end of the winding section 39 remote from the section 40 is connected to the control grid of the valve 6 through a resistance 45 and a bypass condenser 46. Similarly the end of the section 40 remote from the section 39 is connected to the control grid of the valve 7 by a resistance 47 and bypass condenser 48 in parallel with said resistance. A tuning condenser 49 is connected in parallel with the divided secondary winding of the transformer P. A condenser 50 is connected in parallel with the resistance 43 which connects the cathode of the valve 6 to one end of a winding 42, and to the negative terminal of the voltage source R. The other end of the winding 42 is connected to the junction between the winding sections 39 and 40. A condenser 51 is similarly connected in parallel with the resistance 44 through which the cathode of the valve 7 is connected to the winding 42 and to the negative terminal of the voltage source R. A bypass condenser 52 is connected in shunt to the bridge circuit A between the points C and D, and a bypass condenser 53 is connected in parallel with the resistance 8 between the points D and d.

In a balanced type discriminator such as that shown in Fig. 1, the currents flowing in the windings 39 and 40 are of equal magnitude when the frequency of the signal transmitted to the discriminator Q by the limiter tube O is the resonant frequency of the high frequency transformer P, i. e., is the resonant frequency of the divided secondary windings 39 and 40 and the tuning condenser 49. When the frequency of the signal received from the tube O by the transformer P is its resonant frequency, substantially the same potentials are impressed on the control grids of the triodes 6 and 7.

This results from the fact that at resonance the voltages produced across windings 39 and 40, which voltages are in phase opposition, are also in phase quadrature with the voltage across winding 42. As the applied frequency deviates, this phase relation changes so that the sums of the voltages, which must be vectorially added across windings 39 and 42 and across windings 40 and 42 are no longer equal in magnitude but will vary in accordance with the direction and degree of the frequency deviation from the resonant frequency of transformer P. In consequence, the high frequency voltages applied to the control grids of the tubes 6 and 7 are correspondingly varied. This variation, in turn, produces corresponding variations in the unidirectional voltage drops developed across grid leak resistors 45 and 47 by virtue of grid leak detection in tubes 6 and 7. Grid leak resistors 45 and 47 are bypassed by condensers 46 and 47, respectively, as is conventional in grid leak detector circuits. The variations in unidirectional voltages produced across the grid leak resistors 45 and 47 produce corresponding variations in the output current flows of tubes 6 and 7, i. e. through the potentiometer circuit A and through resistor 8.

In the operation of the apparatus shown in Fig. 1 under ideal conditions, the current flowing though the bridge circuit from the point D to the point C and the current flowing through the resistor 8 from the point D to d will have predetermined values such that the potential drop in the bridge circuit between the points D and C will exceed the potential drop in the resistor 8 by an amount equal in magnitude and opposite in direction to the voltage of the standard cell Sc. There will then be no current flow through the resistance J and no resultant modification of the amplification factor of the reactance tube K, and the oscillator tube L will then operate with its predetermined output frequency. The output of the oscillator tube L is amplified by the amplifier M and transmitted through the limiter O to the input circuit of the balance discriminator Q.

In ordinary practice, the ideal conditions assumed in the previous paragraph are not continuously maintained, and the resultant of the potential drop in the bridge circuit and the resistor 8 does not remain equal to the voltage of the standard cell so that there is usually some current flow in one direction or the other through the resistor J. The potential drop in the resistor J produced by the curren flow through the latter constitutes a control signal or bias voltage which is impressed on the control grid of the reactance tube K. When the resultant of the potential drop in the bridge circuit A and in the resistor 8 is greater than the voltage of the standard cell Sc, the signal impressed on the control grid of the tube K makes the grid less negative relative to the cathode of the tube, and thus increases the amplification factor of the tube K. The increase in the amplification factor of the tube K increases the frequency of oscillation of the oscillator tube L and correspondingly increases the frequency of the alternating current signal impressed on the input terminals of the balanced frequency discriminator Q.

This increase in the applied frequency to the frequency discriminator Q is effective, because of the aforesaid discriminator operation, to decrease the current flow and the potential drop in the bridge circuit A between the points D and C, and to increase the current flow and the potential drop in the resistor 8. The effect of the increase in the output frequency of the oscillator tube L is thus a needed reduction in the bridge energizing current. When departure from the ideal condition makes the potential difference between the points d and C smaller than the voltage of the standard cell Sc, the resultant current flow through the resistor J produces such a potential drop therein, that the signal then transmitted to the control grid of the valve K makes the latter increasingly negative relative to the cathode of the tube. This decreases the amplification factor of the tube K and reduces the oscillation frequency of the tube L to a value below its predetermined frequency. The transmission of the reduced frequency from the output circuit of the valve L to the input circuit of the frequency discriminator Q has the effect of increasing the current flow through the bridge circuit, as is then needed.

As those skilled in the art will understand, the above described regulation of the current flow through the bridge circuit in response to the variations in potential drop in the resistor J, is regulation with a drooping characteristic, but with properly designed apparatus, stable control of the bridge energizing circuit can be maintained with variations in the average values of the current flowing through the resistor J too small to significantly effect the accuracy of the measuring apparatus, or to subject the standard cell Sc to an objectionably large current drain.

The apparatus shown in Fig. 1 may be designed for operation in the general manner described above with different circuit constants and values.

Thus the resistance of the bridge circuit between the points C and D may so exceed the resistance of the resistor 8 that when the plate currents of the valves 6 and 7 have suitable equal values, the resultant of the potential drop in the bridge circuit between the points D and C and the potential drop in the resistor 8 will be equal to the voltage of the standard cell Sc. Alternatively, the bridge resistance between the points C and D and the resistance of the resistor 8 may be approximately equal, and in such case the plate current of the valve 6 must exceed the plate current of the valve 7 as required to make the resultant of the potential drop in the resistor 8 and in the bridge circuit between the points C and D equal to the voltage of the standard cell Sc. With each of the designs just mentioned I consider it practically desirable to tune the high frequency transformer P for a resonance frequency different from the predetermined frequency for which the oscillator L is tuned.

In lieu of either of the designs mentioned above I may connect a resistance 8a in series with the resistance 8 in the plate circuit of the valve 7 between the point d and the anode of the valve 7 as illustrated in Fig. 1a. With the sum of the resistances 8 and 8a equal to the bridge resistance between the points C and D and with the resistance 8 and the bridge resistance suitably proportioned, the resultant of the potential drop in the resistor 8 and in the bridge circuit may be made equal to the voltage of the standard cell Sc, under ideal operating conditions, with equal plate currents in the valves 6 and 7. In such case the high frequency transformer P and the oscillator tube L may have the same resonance frequency or those frequencies may differ slightly.

As will be apparent the arrangement shown in Fig. 1 permits of high amplification of minute unidirectional voltages, without requiring the conversion of those voltages into alternating voltages preparatory to their amplification. The use of high frequency currents to effect the amplification, and the variation or modulation of the frequency of those currents to regulate the amplified current output, permit stable operation with a suitably wide regulation range. The high frequencies utilized are readily obtained and varied electronically, as illustrated, but are higher than are practically obtainable with mechanical converters. Since the amplified output of the amplifying network is rectified current, it can be readily separated from objectionable high frequency current components by filter action.

The inclusion in the discriminator of grid-leak triode detector valves 6 and 7, in lieu of the diode detection valves usually employed in discriminators of the general type shown, insures an ample direct current output without requiring low impedance shunts across the resonant circuits of the discriminator. As will be apparent, the advantageous results obtained by the use of triode discriminator valves can be obtained by the use of pentode detector valves. The amplifier M and limiter O tend to prevent variations in the amplitude of the signal impressed on the frequency discriminator Q. Their action may be quite beneficial in some cases since the discriminator Q responds to variations in the amplitude as well as in the frequency of the signal transmitted to it. In other cases, the use of one or the other, or both, of the elements M and O may be omitted without significant detriment to the operative capacity of the network.

Figure 2:
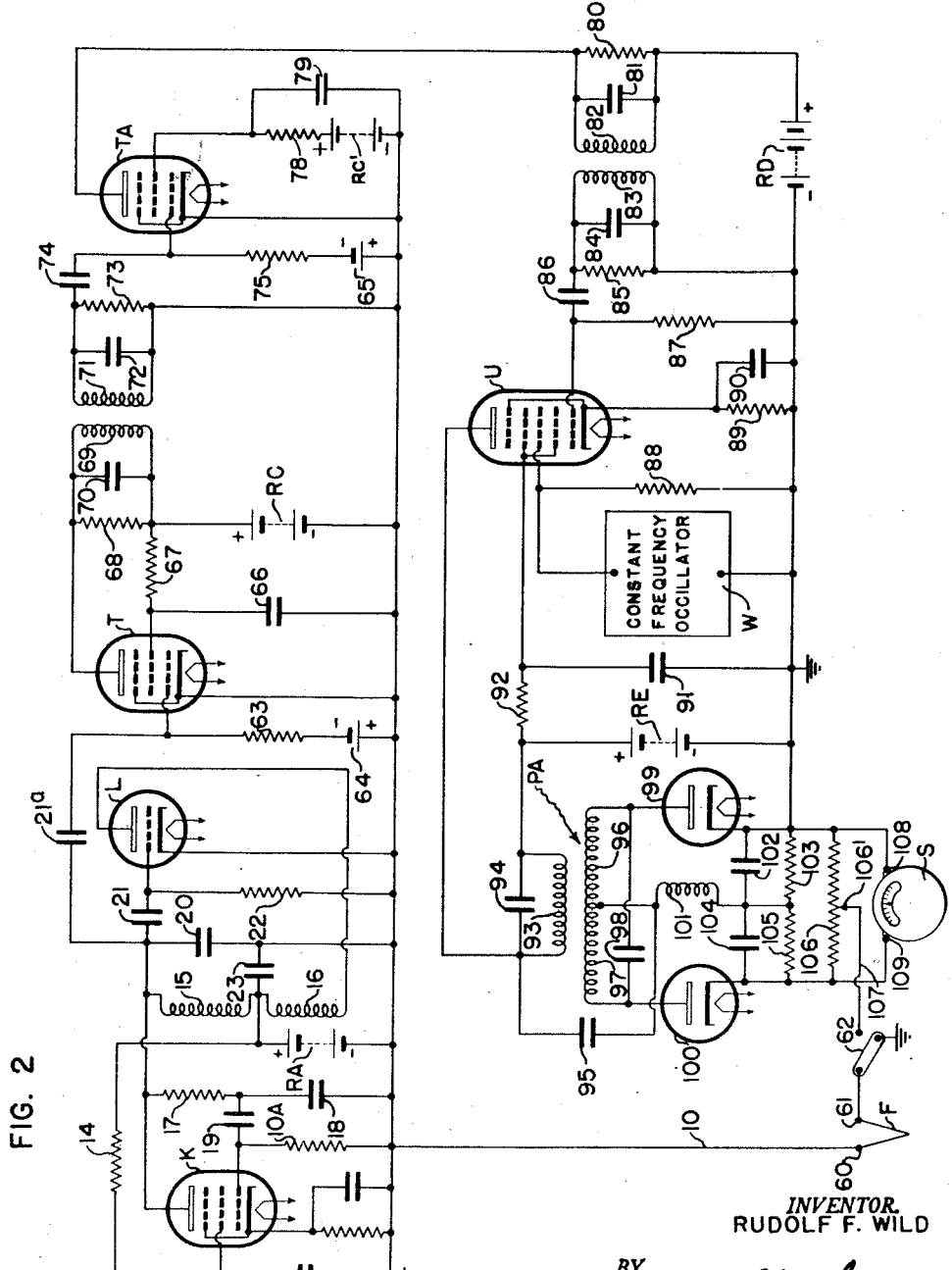
Fig. 2 is a diagram illustrating a second modification of the invention.

As previously indicated, the general principles and advantages of the invention shown in the embodiment of Fig. 1 may take other forms, one of which is shown by way of example in Fig. 2. Fig. 2 diagrammatically illustrates a circuit network differing from that shown in Fig. 1, and is well adapted for use in amplifying small unidirectional signals for various purposes. Fig. 2 illustrates the use of the invention in amplifying a minute thermocouple current and measuring the amplified current with an indicating meter S. The current network shown in Fig. 2 is well adapted for other uses however, and by way of example, I illustrate in Figs. 3 and 4 two other uses of the invention. Thus, as is explained more fully hereinafter, in Fig. 3, the Fig. 2 network is used in controlling the operation of the rebalancing motor of a conventional self balancing potentiometric measuring system, and Fig. 4 illustrates the use of the network in energizing and continuously standardizing the bridge circuit of a potentiometric measuring system.

In the arrangement shown in Fig. 2, a thermocouple F, the voltage of which is to be measured, is connected across the input terminals 60 and 61 of the amplifying circuit network, and a direct current measuring instrument S, shown as an indicating meter, is connected across the output terminals 108 and 109 of said network. As shown, the input terminal 61 is directly connected to ground through a switch 62 when the latter occupies the position shown in full lines in Fig. 2, and when the switch 62 is in the position shown in dotted lines, the input terminal 61 is connected to the output circuit of the amplifying network by feedback conductor 107 to which further reference is hereinafter made. The input terminal 60 is connected through a conductor 10 and the resistance 10A, which should be relatively large, to the control grid of a reactance tube K controlling a high frequency oscillator tube L. The tubes K and L are combined and associated with related circuit elements in Fig. 2, just as they are in Fig. 1, and similar elements in the two figures are designated by the same reference symbols. In Fig. 2 the oscillation frequency of the oscillator tube L is thus regulated through the reactance tube K in accordance with variations in the electromotive force of the thermocouple F.

In the particular arrangement shown in Fig. 2, the output circuit of the oscillator L is connected to the input circuit of a two stage frequency multiplier. The first stage includes a pentode tube T and the second stage includes a pentode tube TA. The output circuit of the oscillator tube L is connected to the input circuit of the tube T and the output circuit of the tube T is connected to the input circuit of the tube TA. The output circuit of the tube TA is connected to the input circuit of a frequency mixer U. In the frequency mixer, the twice multiplied frequency output of the oscillator L is combined with the output of a constant frequency oscillator W to provide a beat frequency of lower value which is transmitted to the input circuit of a balanced frequency discriminator QA. The latter, as shown, is the widely used conventional type comprising two diodes, the cathodes of which are directly connected to the output terminals 108 and 109.

The frequency multiplier pentode T has its suppressor grid connected to its cathode, and has the latter connected directly to ground. The control grid of the tube T is connected by a condenser 21a to the point of engagement of the condensers 20 and 21 and the anode of the valve K. The screen grid of the tube T is connected to ground by condenser 66 and is connected by resistance 67 to the positive terminal of a source of supply voltage RC, to which is connected also the anode of the tube T through a resistance 68 in parallel with a coupling coil 69 and a condenser 70.

For its intended use, the multiplier tube T is preferably of the harmonic distortion type and may well be a class C amplifier, since the plate circuit of such a tube is rich in harmonics. For its frequency multiplier action the plate circuit of the tube T may well be tuned to a frequency which is double the frequency of the signal supplied to the input circuit of the tube so that the output frequency of the tube T is then that of the second harmonic of the input frequency, i. e., the tube T is a frequency doubler. Thus, if the oscillation frequency of the tube L is 450 kc. per second, the plate circuit of the multiplier tube T is tuned to a frequency of 900 kc. per second, which would be the normal output frequency of the tube T. Class C amplifiers ordinarily are operated with a grid bias voltage double the value required for plate current cutoff. Grid bias may be supplied by a battery or a power supply 64.

The multiplier tube TA may be a class C amplifier exactly like the frequency multiplier tube T, except that with the plate circuit of the tube T tuned to a frequency of 900 kc. per second, the plate circuit of the tube TA may be tuned to a frequency of 1800 kc. per second. The output circuit of the tube T is connected to the input circuit of the tube TA by coupling means comprising a coil 71 which is in inductive relation with the coil 69, and is connected in parallel with a condenser 72 and a resistance 73 between ground and one terminal of a condenser 74. The second terminal of the condenser 74 is connected to the control grid of the tube TA, and is also connected to ground through a resistance 75 and a battery 65 provided to supply suitable bias voltage to the control grid of tube TA. The cathode of the tube TA is connected directly to ground. The screen grid of the tube TA is connected to ground through a resistance 78 and a battery RC'. A condenser 79 connects this screen grid directly to ground. The anode of the tube TA is connected through a resistance 80, a condenser 81 and an inductance winding 82, in parallel with one another, to a source of unidirectional current RD shown as a battery connected between the anode and ground.

The winding 82 is in inductive relation with an inductance winding 83. The latter is connected in parallel with a condenser 84 and a resistance 85, and in series with a condenser 86 between ground and one of the two control grids of the mixing tube U. The latter is a pentagrid tube and may well be of the commercially available 6L7 type. Said one control grid is also connected to ground by a resistance 87. The second control grid of the tube U is connected to ground by a resistance 88 and is also connected to one output terminal of the constant frequency oscillator W which has its second terminal connected to ground. The cathode of the valve U is connected to ground by a resistance 89 and a condenser 90 in parallel therewith. Said second control grid is the central one of the five grids of the tube U. The suppressor grid of the tube U is connected to the cathode of the tube, and the other two grids are connected to each other and are connected to ground through a condenser 91, and are connected through a resistance 92 to the positive terminal of a battery RE, the negative terminal of which is grounded, and to one terminal of an inductance winding 93 and a condenser 94 in parallel with the winding 93. The second terminals of the winding 93 and condenser 94 are connected to the anode of the tube U.

The winding 93 forms the primary winding of an intermediate frequency transformer PA through which the output circuit of the mixer U is connected to the input circuit of the frequency discriminator QA. The secondary winding of the transformer PA is divided into two sections 96 and 97. The midpoint of the divided secondary winding is connected by a condenser 95 to the second terminals of the primary winding 93 and condenser 94. The secondary winding sections 96 and 97 are shunted by a condenser 98, and are respectively connected to the anodes of diode valves 99 and 100 included in the balanced frequency discriminator QA. The latter is generally like the discriminator Q of Fig. 1, except that its valves 99 and 100 are diodes, while the valves 6 and 7 of the discriminator Q of Fig. 1 are triodes. The point of engagement of the windings 96 and 97 is connected by a choke coil 101 to the cathode of the tube 99 through a condenser 102 and a resistance 103, and is connected to the cathode of the diode 100 through the coil 101, a condenser 104 and a resistance 105. A resistor 106 is connected in shunt to the resistors 103 and 105. The cathode of the valve 99 is connected to ground, and a contact 106' engaging and adjustable along the resistance 106 is connected to one end of the feedback conductor 107. The latter as previously stated has its other end connected to the input terminal 61 by the switch member 62 when the latter is turned into its position shown in dotted lines in Fig. 2. The cathodes of the diodes 99 and 100 are connected to the output terminals 108 and 109 of the amplifying network.

As previously stated, in the arrangement shown in Fig. 2, an indicating meter S is connected between the output terminals 108 and 109 and provides a suitably amplified measure of the current created by the voltage of the thermocouple F. For the use of the circuit network illustrated in Fig. 2, the switch 62 occupies its full line position, and no use is made of the contact 106' and conductor 107.

The general operation of the amplifying network shown in Fig. 2, is analogous to that of the network shown in Fig. 1, as will be understood by those skilled in the art without further explanation. The network shown in Fig. 2 has certain characteristics especially advantageous for particular uses. The frequency multipliers T and TA materially increase the sensitivity of the amplifying system by quadrupling the frequency change produced by a particular change in the E. M. F. of the thermocouple F. Even greater sensitivity may be obtained if the frequency multipliers are made frequency triplers. With the mixing valve U connected in circuit as shown, the frequency to which the discriminator QA responds is not the high output frequency of the second stage frequency multiplier TA, but is a beat frequency nearer the order of the output frequency of the oscillator L.

The purpose of frequency multiplication in the arrangement of Fig. 2 and the subsequent heterodyning to a lower beat frequency is to increase substantially the percentage frequency deviation caused by a change in thermocouple E. M. F., and thereby, to effect a corresponding increase in the system sensitivity.

While the range over which the multiplier output stages provide frequency multiplication is quite narrow, the sensitivity of the frequency discriminator QA is so high as to permit the required frequency shift in the system to be kept within said narrow range. Thus, for example, if the frequency of the input signal to the multiplier T is 450 kc. per second, the limits within which the tuned circuit included in the plate circuit of the multiplier tube T will be resonant, is of the order of 4½ kc. per second. However, a characteristic of the frequency discriminator QA is that its voltage output may be varied through its complete range of variation when the frequency of the applied signal is changed through a range less than the 4½ kc. per second available. The amplitude of the output signals of each of the multipliers T and TA decreases as the input signal to the amplifier departs from the exact resonant frequency, and since the frequency discriminator QA is responsive to the amplitude as well as the frequency of the signals received by it, it may be desirable, in some cases, to place a limiter, like the limiter O of Fig. 1, between the output circuit of the mixer U and the discriminator QA.

The amount of amplification obtainable with the network of Fig. 2 is limited only by the amount of frequency multiplication provided. The stability of the amplifying network shown in Fig. 2 is limited only by the constancy of the reactance tube and of the frequency discriminator, and is independent of the gain or amplification. The network shown in Fig. 2 may be adjusted by proper choice of circuit components so that with a zero input signal the discriminator QA is in perfect balance and no output signal is produced.

Figure 3:
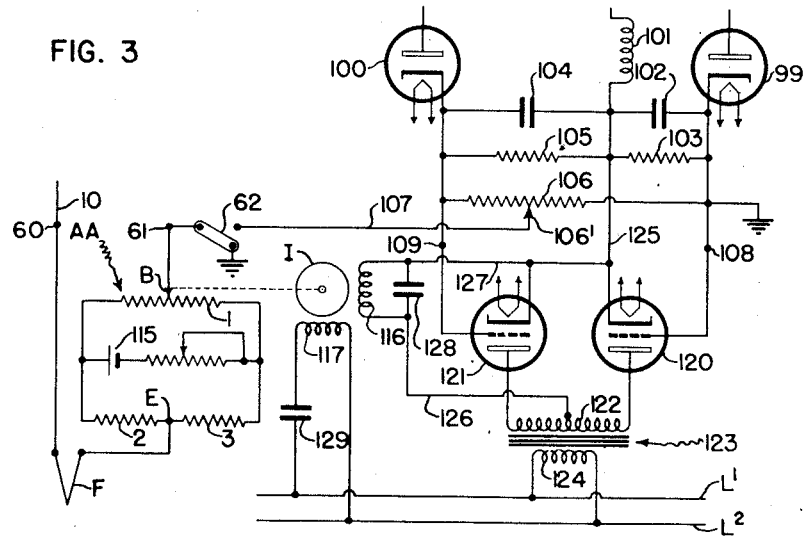
Figs. 3 and 4 are diagrammatic views each illustrating a different use of the circuit network shown in Fig. 2.
Figure 4:
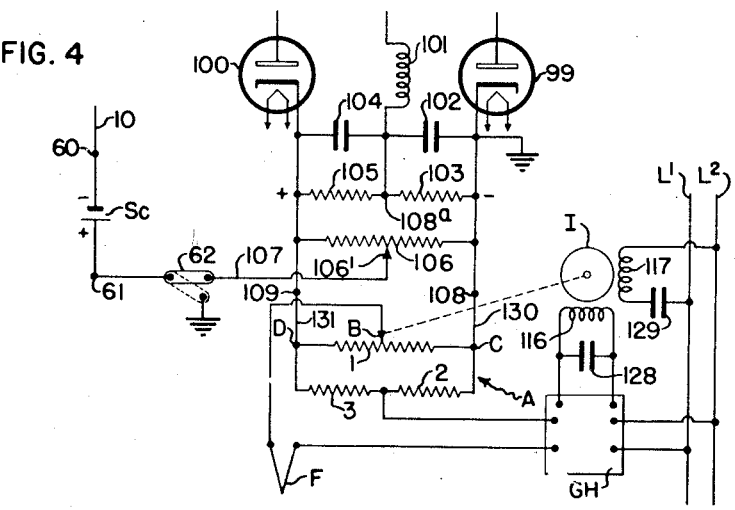

In Fig. 3 I have illustrated the use of the amplifying network shown in Fig. 2 in controlling the rebalancing motor of a self balancing potentiometric measuring circuit generally like that shown in Fig. 1. To simplify the illustration only input and output portions of the amplifying network of Fig. 2 are shown in Fig. 3. The bridge circuit AA shown in Fig. 3 differs from the bridge circuit A of Fig. 1 only in that its energizing circuit includes a battery 115 and the adjustable resistance usually associated with such a battery. In Fig. 3 the input terminals 60 and 61 of the amplifying network of Fig. 2 are connected in the measuring circuit of the potentiometric measuring apparatus. Thus, the bridge point E of the circuit AA is connected to one terminal of the thermocouple F and the second terminal of the thermocouple is connected to the network terminal 60. The slider contact B of Fig. 3 is connected to the network input terminal 61. The contact B is given rebalancing adjustments, as the voltage of the thermocouple F changes, by a reversible rebalancing motor I having a control winding 116 and a power winding 117. The operation of the motor I is controlled by voltage between the output terminals 108 and 109 of the amplifying network.

As diagrammatically shown in Fig. 3, the output terminals 108 and 109 of the amplifying network are connected to the control grids of motor drive valves 120 and 121, respectively. The valves 120 and 121 are triodes which may be of the 7N7 type and are enclosed in a single tube. Their anodes are connected to the opposite ends of the secondary winding 122 of a transformer 123. The latter has its primary winding 124 connected across alternating current supply conductors L' and L², supplying current of conventional voltage and frequency, for example, 115 volts and 60 cycles per second. The cathodes of the valves 120 and 121 are connected to each other and are connected by a conductor 125 to the connected terminals of the resistances 103 and 105, which have their other terminals respectively connected to the cathodes of the discriminator valves 99 and 100. The midpoint of the secondary winding 122 is connected by a conductor 126 to one terminal of the control winding 116 of the re-balancing motor I, and the other terminal of the winding 116 is connected through a conductor 127 to the cathodes of the valves 120 and 121. A condenser 128 is connected in parallel with the winding 116. The power winding 117 of the motor I is connected across the supply conductors L' and L² in series with a condenser 129. For the use illustrated in Fig. 3 the amplifying network is preferably arranged as for the use illustrated in Fig. 2, so that the potential difference between the output terminals will be proportional to, though much larger than the potential difference impressed on the input terminals 60 and 61.

In the normal operation of the apparatus shown in Fig. 3, the switch 62 occupies its full line position as in Fig. 2. When the E. M. F. of the thermocouple F is balanced by the potential difference between the bridge circuit point E and the slider contact B, no signal is impressed on the network input terminals 60 and 61, and there is then no potential difference between the output terminals 108 and 109. Under this condition of operation, pulses of current of equal magnitude will flow in the control winding 116 from the anode circuits of the valves 120 and 121 during each succeeding half cycle of the alternating voltage supplied by the transformer secondary winding 122. Thus for the balanced condition under consideration, pulsating current of twice the frequency of the alternating voltage supplied by the transformer winding 122 is supplied to the motor winding 116. When thus energized, the motor I is not effectively urged to rotation in either direction and remains stationary. Due to the relatively high direct current component of the current then flowing through the motor winding 116, the core structure of the motor tends to be saturated thereby making the inductive reactance of the winding 116 relatively small. The condenser 128 is parallel with the motor winding 116, unites with the latter to form a parallel resonant circuit. The saturation of the core structure of the motor I operates to exert an appreciable damping effect on the rotor of the motor tending to prevent rotation of the latter, and when such saturation occurs with the motor in rotation, the saturation of the core structure operates to quickly stop the motor.

When a change in the E. M. F. of the thermocouple unbalances the measuring system of Fig. 3, a potential difference between the terminals 60 and 61 is created. This results in a change in the potentials of the cathodes of valves 99 and 100 as will be apparent from the previous description of Fig. 2. In consequence, the potential drop across the resistance section 103 is then caused to differ from the potential drop across the resistance 105. As a result the magnitude of the pulses of current flowing through the winding 116 from one of the triodes 120 and 121 will increase, and the magnitude of the pulses of current flowing through the winding from the other triode will be decreased. When the winding 116 is thus energized, the direct current component of the current flowing through the winding 116 is decreased, and the saturation of the motor core structure, and is damping effect, are reduced. In addition, the alternating component of the current supplied to the winding 116 is increased. This alternating component produces an alternating field in the motor structure which reacts with the alternating field established by the power winding 117 to produce a rotating field which causes the rotation of the motor rotor. The direction of rotor rotation thus caused depends upon the direction of current flow through the thermocouple, i. e., upon whether the change in thermocouple voltage is an increase or a decrease. In either event, the direction of movement of the motor is that required for adjustment of the contact B into the position in which the potential difference between the contact B and bridge point E balances the electromotive force of the thermocouple.

In Fig. 4, as in Fig. 3, the illustration is simplified by showing only the input and output portions of the amplifying network shown in Fig. 2. As previously stated, Fig. 4 illustrates the use of the amplifying network shown in Fig. 2 in energizing and continuously standardizing the bridge circuit A of a balanced potentiometric measuring system like that shown in Fig. 1. For such use, a standard cell Sc is connected between the input terminals 60 and 61, and the switch 62 is turned into the position shown in full lines in Fig. 4, in which the input terminal 61 is connected by the conductor 107 to a contact 106'. The latter is adjustable along and set at a point along the resistance 106 at which the potential differs from the potential of the grounded cathode of the valve 99 by an amount which balances the voltage of the standard cell Sc when the potential difference between the amplifier output terminals 108 and 109 is that required for the maintenance of the desired current flow through the bridge circuit.

In Fig. 4 the output terminals 108 and 109 of the amplifying network are respectively connected by conductors 130 and 131 to the bridge circuit points C and D. Those points are connected to the opposite ends of the slide wire resistance 1 and to the opposite ends of the bridge circuit branch including resistances 2 and 3, as they are in Fig. 1. In Fig. 4, the slider contact B is adjusted along the slide wire resistance 1 as required to rebalance the measuring circuit, following a change in the voltage of the thermocouple F, by a motor I which may be exactly like the motor I of Fig. 1, and may be controlled in the same manner. In the diagram shown in Fig. 4, the element GH comprises balance detecting and amplifying and motor driving apparatus for effecting the operative results collectively effected by the devices G and H of Fig. 1. The operation of the motor I of Fig. 4 is directly dependent on the energization of the control winding 116 of the motor I, as shown in Fig. 3, and as is actually the case with the more simply illustrated motor I of Fig. 1.

In Fig. 4, the amplifying network is so arranged that when no signal is transmitted to the reactance tube through the conductor 10 from the input terminal 60, a unidirectional voltage is maintained between the output terminals 108 and 109, which is approximately equal to the constant predetermined potential difference desired between the bridge circuit points C and D. Under ideal conditions, the voltage between the output terminals 108 and 109 may be exactly equal to the desired predetermined potential difference between the bridge points C and D, but in practice such ideal conditions are not continuously maintained and the voltage between the terminals 108 and 109 may sometimes exceed and sometimes be less than the predetermined and desired potential difference between the points C and D.

When the voltage between the terminals 108 and 109 varies from the value needed for the proper energization for the bridge circuit, a signal is transmitted to the reactance tube through the conductor 10 which will increase or decrease the actual voltage between the terminals 108 and 109 as may be required to make the difference between the actual value of the voltage and the desired value of the voltage insignificantly small.

The control signal impressed on the input circuit of the amplifying network when regulation of the voltage between the output terminals 108 and 109 is needed, is provided by the previously described connection of the standard cell Sc between the conductor 10 and a predetermined point along the resistance connection between the output terminals 108 and 109. Said predetermined point is that at which the contact 106' engages the resistance section 106. The resistances 103 and 105 connected in series between the cathodes of the valves 99 and 100, and the resistor 106 and slider contact 106' form a voltage divider, and the point at which the contact 106' is set to engage the resistance 106, is that at which the voltage of the standard cell Sc is balanced by the voltage between ground and the contact 106', when the bridge energizing current is at the proper value. When the opposing voltages are equal, no signal, or, more accurately, a zero signal, is impressed on the input circuit of the amplifying system. When the voltage between the output terminals 108 and 109 is smaller than is needed for predetermined energization of the bridge circuit, current will flow through the standard cell to the contact 106' with the result of making the control grid of the reactance tube K more negative, whereupon the amplifier will automatically operate to increase the voltage between the output terminals 108 and 109, and thus insure proper energization of the bridge circuit. Conversely, when the voltage difference between the terminals 108 and 109 exceeds the desired amount, the corresponding increase in potential difference between the contact 106' and ground will make the control grid of the reactance tube K less negative relative to the cathode of the tube, and thus actuate the amplifier system to suitably reduce the voltage between the output terminals 108 and 109.

Certain continuous standardizing combinations disclosed, but not generically claimed herein, are generically claimed in the copending application of Walter P. Wills, Ser. No. 721,418, filed concurrently herewith and now Patent No. 2,536,245 of December 11, 1950.

Subject matter disclosed but not claimed herein is being disclosed and claimed in my copending divisional application Serial No. 168,667, filed June 17, 1950.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In measuring apparatus, the combination with a bridge circuit having energizing terminals, of means for energizing and continuously standardizing said circuit comprising an electronic oscillator tube having an input circuit and an output circuit and producing a high frequency output current, a balanced frequency discriminator having an input circuit connected to the output circuit of said oscillator and having an output circuit including two electronic valves with their cathodes connected to the energizing terminals of said bridge circuit and varying inversely in potential as the frequency in the output circuit of the oscillator tube is varied, a source of standard voltage, and means connected to said cathodes and to said source of voltage and responsive to the difference between the standard voltage and at least a portion of the potential difference between said cathodes for impressing a control signal on the input circuit of said oscillator tube and thereby varying the frequency of said high frequency output current when the first mentioned difference departs from a predetermined value.

2. In measuring apparatus, the combination with a bridge circuit having energizing terminals, of means for energizing and continuously standardizing said circuit, comprising an electronic oscillator tube having an input circuit and an output circuit and producing a high frequency output current, a balanced frequency discriminator having an input circuit connected to the output circuit of said oscillator and having an output circuit including two electronic valves with cathodes varying inversely in potential as the frequency in the output circuit of the oscillator tube is varied, said cathodes being connected to the energizing terminals of said bridge circuit, resistance connecting said cathodes, a standard cell connected to said resistance in bucking relation therewith, and means responsive to the difference between the voltage of said standard cell and at least a portion of the potential difference between said cathodes for impressing a control signal on the input circuit of said oscillator tube and thereby varying the frequency of said high frequency output current.

3. Apparatus as specified in claim 2, wherein said responsive means comprises a reactance tube having an input circuit connected to said standard cell and said resistance, and having an output circuit connected to the input circuit of said oscillator tube.

4. Apparatus for maintaining a substantially constant unidirectional current flow through a bridge circuit comprising in combination with said circuit, a resistance in series with said circuit, two electronic valves, each having an input circuit and an output circuit, said bridge circuit being included in the output circuit of one valve and said resistance being included in the output circuit of the other valve, an electronic oscillator having an input circuit and an output circuit and operating to maintain a high frequency alternating current in its output circuit, a standard cell connected to said bridge circuit in bucking relation therewith, means responsive to variations in the current flow through said bridge circuit and standard cell and connected to said oscillator input circuit to increase or decrease the frequency of said alternating current when the bridge current flow varies in one direction or in the opposite direction from a predetermined normal value of said bridge current flow, a balanced frequency discriminator having an input circuit operatively connected to the output circuit of said oscillator and comprising means connected to the input circuits of the two valves for increasing or decreasing the current flow in the output circuit of one, and simultaneously decreasing or increasing the current flowing in the output circuit of the second of said valves as the frequency of said high frequency current respectively increases or decreases.

5. Apparatus for maintaining an approximately constant unidirectional current flow through a bridge circuit, comprising in combination with said circuit, a first resistance in series with said circuit, a shunt to said bridge circuit and first resistance including a standard cell and a second resistance, two electronic valves, each having an input circuit and an output circuit, said bridge circuit being included in the output circuit of one valve and said first resistance being included in the output circuit of the other valve, an electronic oscillator having an input circuit and an output circuit for maintaining a high frequency alternating current, means responsive to current flow through said second resistance and connected to said oscillator input circuit to increase or decrease the frequency of said alternating current when current flows through said second resistance in one direction or in the opposite direction, respectively, a balanced frequency discriminator having an input circuit operatively connected to the output circuit of said oscillator and comprising means connected to the input circuits of the two valves for increasing or decreasing the current in the output circuit of one, and simultaneously decreasing or increasing the current in the output circuit of the second, of said valves as the frequency of said high frequency current respectively increases or decreases.

6. Apparatus as specified in claim 5, wherein said responsive means comprises a reactance tube having an input circuit connected to said second resistance, and having an output circuit connected to the input circuit of said oscillator.

7. In measuring apparatus, the combination with a bridge circuit including a slide wire having energizing terminals across which a D. C. voltage is impressed, a cooperating slider contact, and a circuit portion connected between said slider contact and a fixed point in the bridge circuit and including a source of D. C. voltage to be measured, of a control device including means for creating a unidirectional signal varying in magnitude and direction with the current flow through said circuit portion and including adjusting means mechanically associated with said slide wire and slider contact, and operative in response to said signal to adjust said slider contact relative to said slide wire in the direction to minimize said current, a control device including means for creating a unidirectional signal varying in magnitude and direction with the magnitude and direction of the difference between the actual value and a predetermined normal value of said voltage across said terminals and including adjusting means connected to said terminals and operative in response to the last mentioned signal to adjust the voltage across said terminals to minimize the difference between said values, one of said control devices comprising an electronic oscillator tube having an input circuit and output circuit and producing a high frequency output current, means for impressing the signal to which the last mentioned control device is responsive on said input circuit, and a balanced frequency discriminator having an input circuit connected to the output circuit of said oscillator and having an output circuit included in the adjusting means of the last mentioned control device and including a resistance and two electronic valves with their cathodes connected to one another by said resistance and varying inversely in potential as the corresponding signal varies.

RUDOLF F. WILD.

REFERENCES CITED

The following references are of record in the file of this patent:

UNITED STATES PATENTS

| Number | Name | Date |
| --- | --- | --- |
| 2,279,659 | Crosby | Apr. 14, 1942 |
| 2,296,092 | Crosby | Sept. 15, 1942 |
| 2,373,275 | Thomas | Apr. 10, 1945 |
| 2,404,344 | Wild | July 16, 1946 |
| 2,423,617 | Rath | July 8, 1947 |